(12) United States Patent
Gao

(10) Patent No.: US 12,279,733 B2
(45) Date of Patent: Apr. 22, 2025

(54) WATERPROOF CLEANING FABRIC FOR DAILY USE AND COMPOSITE PRODUCTION PROCESS THEREFOR

(71) Applicant: NINGBO TEX-BONDED FABRIC CO., LTD, Ningbo (CN)

(72) Inventor: Xunyi Gao, Ningbo (CN)

(73) Assignee: NINGBO TEX-BONDED FABRIC CO., LTD, Ningbo (CN)

(*) Notice: Subject to any disclaimer, the term of this patent is extended or adjusted under 35 U.S.C. 154(b) by 778 days.

(21) Appl. No.: 17/623,076

(22) PCT Filed: Jun. 17, 2020

(86) PCT No.: PCT/CN2020/096533
§ 371 (c)(1),
(2) Date: Dec. 27, 2021

(87) PCT Pub. No.: WO2020/259364
PCT Pub. Date: Dec. 30, 2020

(65) Prior Publication Data
US 2022/0265112 A1    Aug. 25, 2022

(30) Foreign Application Priority Data

Jun. 28, 2019  (CN) .......................... 201910573699.3

(51) Int. Cl.
*A47L 13/16* (2006.01)
*B32B 7/12* (2006.01)
(Continued)

(52) U.S. Cl.
CPC ................ *A47L 13/16* (2013.01); *B32B 7/12* (2013.01); *B32B 27/12* (2013.01); *B32B 27/40* (2013.01);
(Continued)

(58) Field of Classification Search
CPC ............. A47L 13/16; B32B 2037/1223; B32B 2038/0076; B32B 2307/7145;
(Continued)

(56) References Cited

U.S. PATENT DOCUMENTS

| 2017/0183441 A1* | 6/2017 | Makal ................... C08G 18/68 |
| 2019/0099989 A1 | 4/2019 | Chang |
| 2022/0265112 A1* | 8/2022 | Gao ......................... B32B 5/02 |

FOREIGN PATENT DOCUMENTS

| CN | 201406600 Y | 2/2010 |
| CN | 103302949 A | 9/2013 |

(Continued)

OTHER PUBLICATIONS

International Search Report (Translation), PCT/CN2020/096533, Sep. 22, 2020, 3 Pages.

(Continued)

*Primary Examiner* — Sonya M Sengupta
(74) *Attorney, Agent, or Firm* — Goodhue, Coleman & Owens, P.C.

(57) ABSTRACT

A waterproof cleaning fabric for daily use includes a fabric layer, a middle layer and a waterproof layer. At least one fabric layer and at least one middle layer are provided, and the middle layer is disposed between the fabric layer and the waterproof layer; the middle layer is made of 100% reactive polyurethane hot melt adhesive which is in a solid state at room temperature, and the thermal resistance is greater than 140° C. According to the waterproof cleaning fabric for daily use and a composite production process therefor, a source generated by "waste gas" is fundamentally eradicated to achieve an entire composite production process that is waste gas-free, hot gas-free and noise-free. A high degree of environmental friendliness of said process is guaranteed, (Continued)

while the reduction of composite production costs is promoted, and the quality of the product is overall improved.

8 Claims, 2 Drawing Sheets

(51) Int. Cl.
    *B32B 27/12*     (2006.01)
    *B32B 27/40*     (2006.01)
    *B32B 37/06*     (2006.01)
    *B32B 37/12*     (2006.01)
    *B32B 38/00*     (2006.01)
    *B32B 38/18*     (2006.01)

(52) U.S. Cl.
    CPC .......... *B32B 37/06* (2013.01); *B32B 37/1207* (2013.01); *B32B 38/0004* (2013.01); *B32B 38/0036* (2013.01); *B32B 38/18* (2013.01); *B32B 2037/1223* (2013.01); *B32B 2038/0076* (2013.01); *B32B 2307/7145* (2013.01); *B32B 2307/7265* (2013.01); *B32B 2432/00* (2013.01)

(58) Field of Classification Search
    CPC ........ B32B 2307/7265; B32B 2432/00; B32B 27/12; B32B 27/40; B32B 37/06; B32B 37/1207; B32B 38/0004; B32B 38/0036; B32B 38/18; B32B 5/02; B32B 7/12
    See application file for complete search history.

(56) References Cited

FOREIGN PATENT DOCUMENTS

| | | | | | |
|---|---|---|---|---|---|
| CN | 105522809 | A | | 4/2016 | |
| CN | 106378980 | A | * | 2/2017 | |
| CN | 106494049 | A | | 3/2017 | |
| CN | 106696406 | A | | 5/2017 | |
| CN | 206383616 | U | | 8/2017 | |
| CN | 107187132 | A | | 9/2017 | |
| CN | 109291596 | A | | 2/2019 | |
| CN | 109310556 | A | * | 2/2019 | ............. A01N 25/10 |
| CN | 109501417 | A | | 3/2019 | |
| CN | 109778524 | A | | 5/2019 | |
| CN | 110116525 | A | | 8/2019 | |

OTHER PUBLICATIONS

Written Opinion (Non-Translation), PCT/CN2020/096533, Sep. 22, 2020, 4 Pages.

The State Intellectual Property Office of People's Republic of China, First Office Action, Chinese Application No. 201910573699.3, Aug. 4, 2020, 8 pages.

The State Intellectual Property Office of People's Republic of China, Second Office Action, Chinese Application No. 201910573699.3, Mar. 25, 2021, 9 pages.

* cited by examiner

WATERPROOF CLEANING FABRIC FOR DAILY USE AND COMPOSITE PRODUCTION PROCESS THEREFOR

CROSS REFERENCE TO RELATED APPLICATION

This application is a national stage application of International Patent Application No. PCT/CN2020/096533, filed on Jun. 17, 2020, which claims the priority of Chinese Patent Disclosure No. 201910573699.3, entitled "WATERPROOF CLEANING FABRIC FOR DAILY USE AND COMPOSITE PRODUCTION PROCESS THEREFOR" filed with the Chinese Patent Office on Jun. 28, 2019, which is incorporated herein by reference in its entirety.

TECHNICAL FIELD

The present disclosure relates to the technical field of waterproof cleaning fabrics and processes for laminating same, in particular to a waterproof cleaning fabric for daily use and a composite production process thereof.

BACKGROUND ART

With development of science and technology, and increasing requirements from people on performance of daily necessities, waterproof fabrics are increasingly used in people's lives, such as soft fabrics that are antibacterial, deodorant, breathable, moisture-absorbing and waterproof. A waterproof cleaning fabric for daily use and existing composite production process thereof were disclosed ten years ago (utility application NO. 200920119052.5, publication NO. CN201406600Y). The waterproof cleaning fabric for daily use is of three-layer structure: a fabric layer made of materials selected from cotton, polyester, polyester cotton, flannel, bamboo cotton, non-woven fabric, etc. as desired; a waterproof layer made of thermoplastic polyurethane membrane; a middle layer made of polyurethane adhesive. The adhesive used in the existing composite production technology is liquid. In order to enhance cohesive force and fluidity, it is equipped with bridging agents and diluents, resulting in production of alkanes and aromatic hydrocarbons "exhaust gas", which must be discharged after purification treatment by the catalytic oxidation furnace of the collection device. Due to the existence of the "exhaust gas" purification process in the existing composite production process, it is to provide expensive purification facilities, a large number of facility operating expenses and management expenses increase production costs and inhibit production development.

In view of the limitations of the existing composite production process, it is urgent to reform the existing composite production mode, eliminate the generation of "exhaust gas", create a clean and environmentally friendly production environment, reduce resource consumption and production costs, and realize transformation of the composite production process

SUMMARY

The purpose of the present disclosure is to provide a waterproof cleaning fabric for daily use and a composite production process thereof, which fundamentally eliminates source of "exhaust gas", realizes no exhaust gas, no hot gas and no noise in the whole composite production process, and ensures a high degree of environmental protection in the whole composite production process, while promoting reduction of composite production costs, and improving quality of products in all aspects.

In order to achieve the above purpose, it is provided a waterproof cleaning fabric for daily use, including a fabric layer, a middle layer and a waterproof layer. At least one fabric layer and at least one middle layer are provided, and the middle layer is arranged between the fabric layer and the waterproof layer, the middle layer is made of 100% polyurethane reactive hot melt adhesive, the polyurethane reactive hot melt adhesive is solid at room temperature and has a heat resistance temperature greater than 140° C.

A composite production process of the waterproof cleaning fabric for daily use, comprising following steps of:

fabric placing step for placing the fabric on a fabric feeding rack, and a waterproof membrane on a membrane feeding roller, and rotating the fabric feeding rack and the membrane feeding roller simultaneously for feeding;

first combining step for conveying the fabric to a hot melt transfer device through a transmission chain to be firstly combined with the waterproof membrane subjected to glue dot shift, to obtain waterproof cleaning fabric, trimming step for trimming the combined waterproof cleaning fabric through a trimming cutter;

winding step for winding the trimmed waterproof cleaning fabric up through a swinging arm winding device to obtain a first finished product;

finished product curing step for curing the first finished product after the winding step; wherein when curing time is within 24 hours, 90% of the first finished product is cured; when the curing time is 5-7 days, 90%-100% of the first finished product is cured; a curing warehouse is maintained at a constant temperature not less than 25° C. and a humidity of 60%.

In some embodiments, the composite production process further comprises: second combining step for combining the waterproof cleaning fabric combined firstly, with additional fabric, where the second combining step comprises: placing the waterproof cleaning fabric combined firstly on the membrane feeding roller, and placing the additional fabric on a lining feeding rack; rotating the lining feeding rack and the membrane feeding roller for feeding; passing the additional fabric, though hydraulic deviation-rectifying devices, to the hot melt transfer device; secondly combining the additional fabric with the waterproof cleaning fabric combined firstly which has been subjected to the glue dot shift; trimming the waterproof cleaning fabric combined secondly, through the trimming cutter to obtain a multi-layer cleaning fabric sandwiched with a waterproof membrane; winding the multi-layer cleaning fabric to obtain a second finished product; and curing the wound second finished product.

In some embodiments, before the waterproof membrane is glued, an adhesive bucket is preheated to 110° C.; during a gluing process, a temperature in winter is controlled at 103° C.-105° C., a temperature in summer is controlled at 100° C., and a humidity is controlled at 60%.

In some embodiments, a hot melt glue machine is used in the composite production process, and the hot melt glue machine comprises the fabric feeding rack, the swinging arm winding device, the trimming cutter, the hot melt transfer device, the membrane feeding roller, and the lining feeding rack; the hot melt transfer device comprises a housing and a driving combination press roller, a driven combination press roller, a driven gluing roller and a driving gluing roller; the driving gluing roller, the driven gluing roller, the driven combination press roller and the driving combination press roller are all arranged in the housing, a glue scraper is arranged on an inner wall of the housing, and the glue scraper is arranged below the driving gluing roller.

In some embodiments, the driving gluing roller and the driven gluing roller are arranged in a same horizontal line, and the driving combination press roller and the driven combination press roller are arranged in a same vertical line, a side of the driving combination press roller is provided with an aluminum distribution roller, and the aluminum distribution roller is arranged right above the driven gluing roller.

In some embodiments, the swinging arm winding device comprises a frame body, a swinging arm arranged on the frame body, and a winding press roller connected with the swinging arm and a winding frame, and the winding frame is arranged right below the winding press roller.

In some embodiments, a winding expander is arranged above the transmission chain, and a hydraulic deviation correction device is arranged behind the winding expander as well as in front of the lining feeding rack.

In some embodiments, an electric hoist is arranged above the hot melt transfer device and the lining feeding rack.

Therefore, through the waterproof cleaning fabric for daily use and the composite production process thereof, the present disclosure has the following technical effects.

(1) The source of "exhaust gas" is fundamentally eliminated, and in the whole composite production process there is no exhaust gas, no hot gas and no noise, to ensure a high degree of environmental protection in the whole composite production process, facilitate the reduction of composite production costs, and improve the quality of products in all directions.

(2) The finished products produced through the composite production process of the present disclosure have antibacterial, deodorant, breathable, moisture-absorbing, soft, and environmentally friendly properties.

(3) The waterproof cleaning fabric for daily use produced through the composite production process of the present disclosure can be washed with water many times, used repeatedly, and have stable performance. After testing, the product is repeatedly washed 40 times in a water temperature of 90° C. for 30 minutes each time. The product is not damaged, without degumming, and has no leakage, stable performance and good quality.

(4) The waterproof cleaning fabric for daily use produced through the composite production process of the present disclosure is recognized and welcomed by the majority of customers, and has achieved better social and economic benefits.

The technical solutions of the present disclosure will be further described in detail below through the accompanying drawings and embodiments.

DETAILED DESCRIPTION OF THE EMBODIMENTS

The present disclosure provides a waterproof cleaning fabric for daily use, including a fabric layer, a middle layer and a waterproof layer. At least one fabric layer and at least one middle layer are provided, and the middle layer is arranged between the fabric layer and the waterproof layer. The middle layer is made of 100% polyurethane reactive hot melt adhesive which is solvent-free and odorless and has no heavy metals. The polyurethane reactive hot melt adhesive is solid at room temperature, melted into liquid when heated for gluing, and quickly cooled and cured into a solid after bonding the fabric, producing a strong adhesive strength. The polyurethane reactive hot melt adhesive has a heat resistance temperature greater than 140° C. and good resistance to solvent and hydrolysis. The polyurethane reactive hot melt adhesive is characterized by that the molecular chain ends have active genes, after the adhesive is applied, the adhesive can use the water vapor in the air to quickly connect the molecules into linear chains to form a network structure to solidify, and the strength is rapidly improved.

Figure 1:
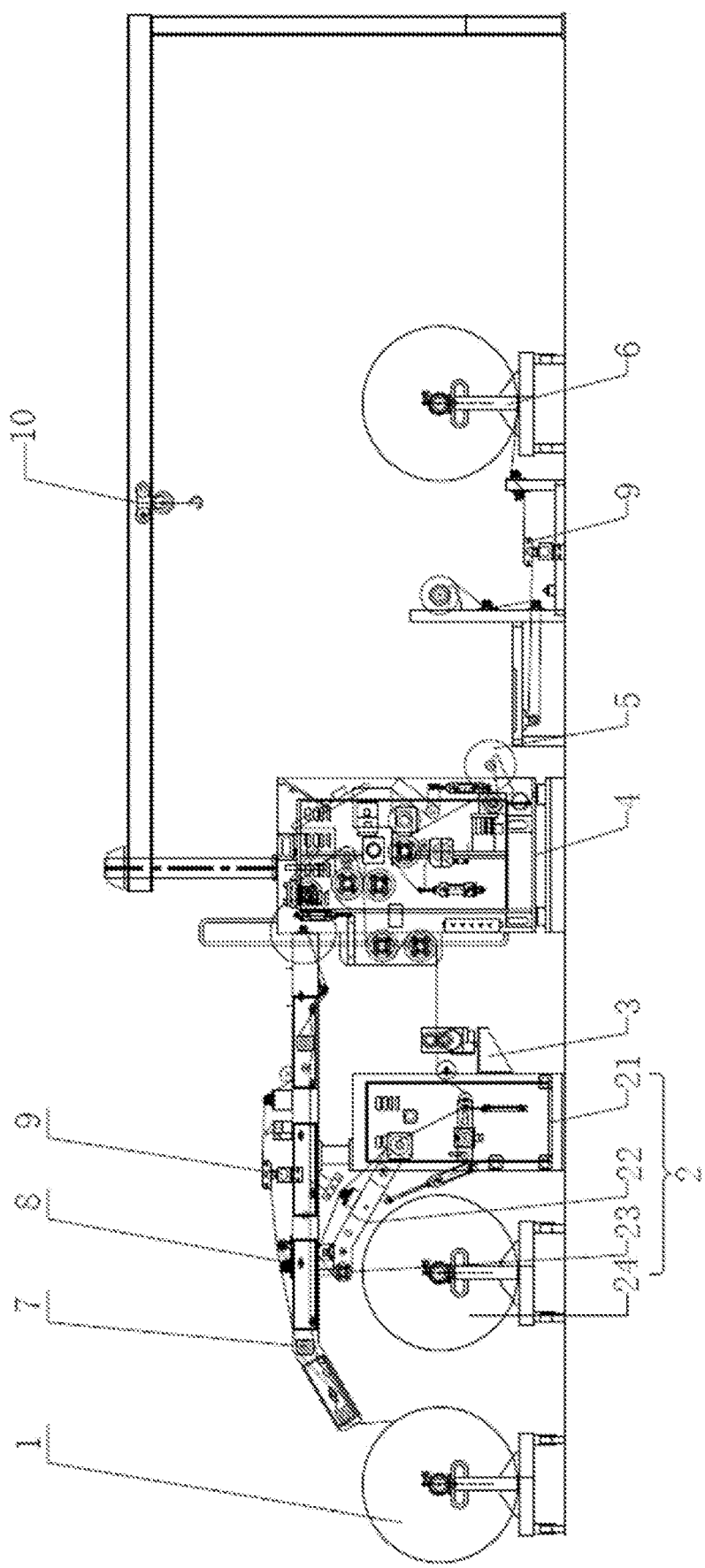
FIG. 1 is a schematic structural diagram of an embodiment of a composite production process for a waterproof cleaning fabric for daily use according to the present disclosure.
Figure 2:
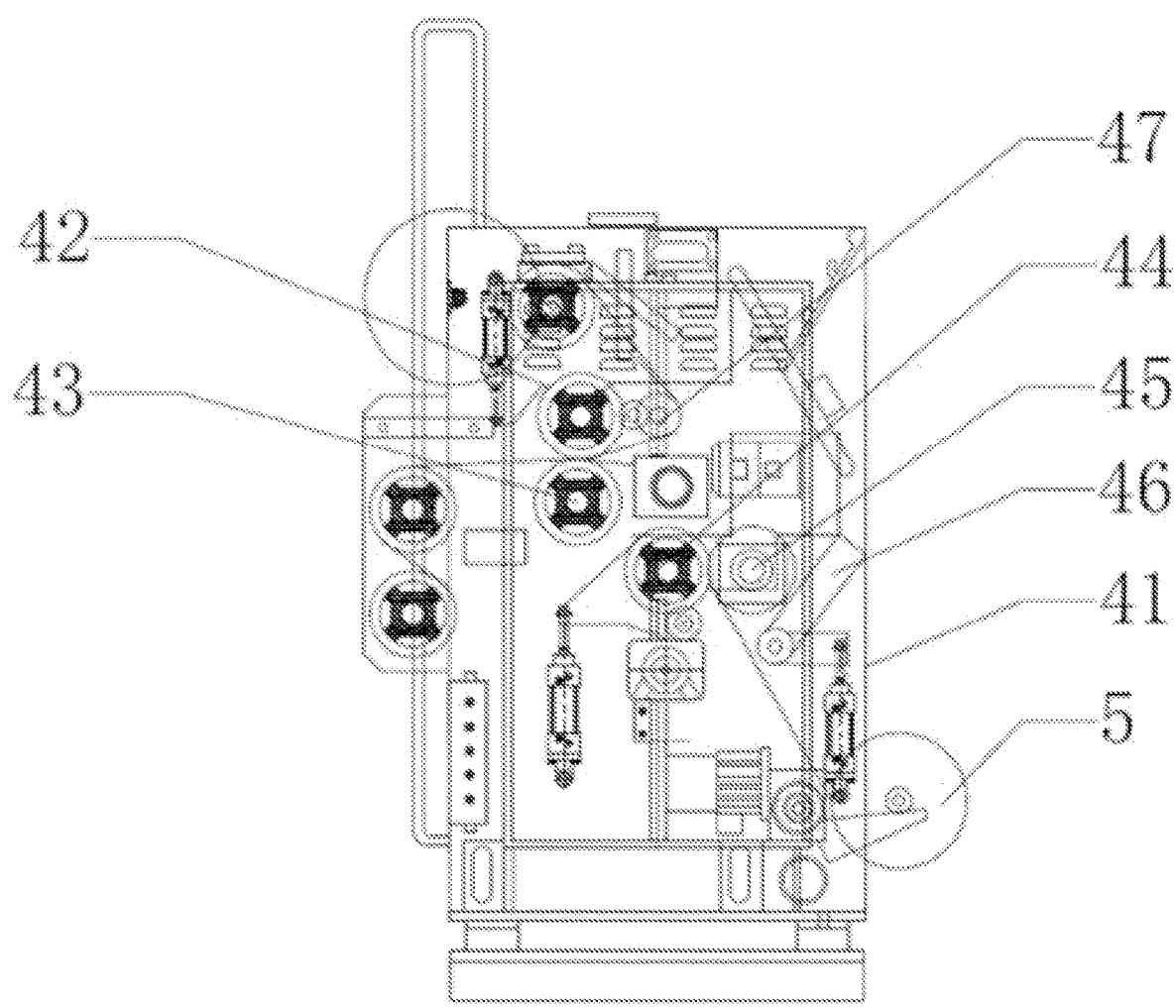
FIG. 2 is a schematic structural diagram of a hot melt transfer device for the embodiment of the composite production process for the waterproof cleaning fabric for daily use according to the present disclosure.

FIG. 1 is a schematic structural diagram of an embodiment of a composite production process for the waterproof cleaning fabric for daily use according to the present disclosure, and FIG. 2 is a schematic structural diagram of a hot melt transfer device for the embodiment of the composite production process for the waterproof cleaning fabric for daily use according to the present disclosure. As shown in the drawings, the hot melt glue machine is used in the composite production process for the waterproof cleaning fabric for daily use. The hot melt glue machine includes a fabric feeding rack 1, a swinging arm winding device 2, a trimming cutter 3, a hot melt transfer device 4, a membrane feeding roller 5 and a lining feeding rack 6. The hot melt transfer device 4 includes a housing 41, a driving combination press roller 42, a driven combination press roller 43, and a driven gluing roller 44 and a driving gluing roller 45. The driving gluing roller 45, the driven gluing roller 44, the driven combination press roller 43 and the driving combination press roller 42 are all arranged in the housing 41, and an inner wall of the housing 41 is provided with a glue scraper 46. The glue scraper 46 is arranged below the driving gluing roller 45, which can scrape off excess glue.

The driving gluing roller 45 and the driven gluing roller 44 are arranged in the same horizontal line. The driving combination press roller 42 and the driven combination press roller 43 are located in the same vertical line. A side of the driving combination press roller 42 is provided with an aluminum distribution roller 47. The aluminum distribution roller 47 is arranged right above the driven gluing roller 44 to spread the fabric to prevent from wrinkling.

The swinging arm winding device 2 includes a frame body 21, a swinging arm 22 arranged on the frame body 21, a winding press roller 23 connected with the swinging arm 22, and a winding frame 24. The winding frame 24 is arranged right below the winding press roller 23. A winding expander 8 is arranged above the transmission chain 7, and hydraulic deviation correction devices 9 are provided behind the winding expander 8 and in front of the lining feeding rack 6 respectively. An electric hoist 10 is provided above the hot melt transfer device 4 and the lining feeding rack 6.

Embodiment I

The present disclosure provides a waterproof cleaning fabric for daily use, which includes a fabric layer, a middle layer and a waterproof layer. One waterproof layer and one middle layer are provided. The fabric includes the fabric layer, the middle layer and the waterproof layer from top to bottom. The middle layer is made of 100% polyurethane reactive hot melt adhesive.

A composite production process for the waterproof cleaning fabric for daily use, including the following steps of:

fabric placing step for placing the fabric on a fabric feeding rack, and a waterproof membrane on a membrane feeding roller, and rotating the fabric feeding rack and the membrane feeding roller simultaneously for feeding;

first combining step for conveying the fabric to a hot melt transfer device through a transmission chain to be firstly combined with the waterproof membrane subjected to glue dot shift, to obtain waterproof cleaning fabric, where the waterproof membrane is subjected to the glue dot shift between a driving gluing roller and a driven gluing roller; combining the waterproof membrane with glue and the fabric through the driving combination press roller and the driven combination press roller; where before the waterproof membrane is glued, a glue bucket is preheated to 110° C.; during a gluing process, the temperature in winter is controlled at 103° C.-105° C., the temperature is controlled at 100° C. in summer, and the humidity is controlled at 60%;

trimming step for trimming the combined waterproof cleaning fabric through a trimming cutter;

winding step for winding the trimmed waterproof cleaning fabric up through a swinging arm winding device to obtain a first finished product;

finished product curing step for curing the first finished product after the winding step; where when curing time is within 24 hours, 90% of the first finished product is cured; when the curing time is 5-7 days, 90%-100% of the first finished product is cured; a curing warehouse is maintained at a constant temperature not less than 25° C. and a humidity of 60%, thereby obtaining a cleaning fabric with the water proof membrane on one side.

Embodiment II

The present disclosure provides a waterproof cleaning fabric for daily use, which includes a fabric layer, a middle layer and a waterproof layer. Two waterproof layers and two middle layers are provided. The waterproof cleaning fabric includes a first fabric layer, a first middle layers, the waterproof layer, a second middle layer and a second fabric layer from top to bottom. The middle layers are made of 100% polyurethane reactive hot melt adhesive.

A composite production process for the waterproof cleaning fabric for daily use, including the following steps of:

fabric placing step for placing the fabric on a fabric feeding rack, and a waterproof membrane on a membrane feeding roller, and rotating the fabric feeding rack and the membrane feeding roller simultaneously for feeding;

first combining step for conveying the fabric to a hot melt transfer device through a transmission chain to be firstly combined with the waterproof membrane subjected to glue dot shift, to obtain waterproof cleaning fabric, where before the waterproof membrane is glued, a glue bucket is preheated to 110° C.; during a gluing process, the temperature in winter is controlled at 103° C.-105° C., the temperature is controlled at 100° C. in summer, and the humidity is controlled at 60%;

trimming step for trimming the combined waterproof cleaning fabric through a trimming cutter;

winding step for winding the trimmed waterproof cleaning fabric up through a swinging arm winding device to obtain a first finished product;

finished product curing step for curing the first finished product after the winding step; where when curing time is within 24 hours, 90% of the first finished product is cured; when the curing time is 5-7 days, 90%-100% of the first finished product is cured; a curing warehouse is maintained at a constant temperature not less than 25° C. and a humidity of 60%, thereby obtaining a cleaning fabric with the water proof membrane on one side.

second combining step for combining the waterproof cleaning fabric combined firstly, with additional fabric; where the second combining step comprises: placing the waterproof cleaning fabric combined firstly on the membrane feeding roller, and placing the additional fabric on a lining feeding rack; rotating the lining feeding rack and the membrane feeding roller for feeding; passing the additional fabric, though hydraulic deviation-rectifying devices, to the hot melt transfer device; secondly combining the additional fabric with the waterproof cleaning fabric combined firstly which has been subjected to the glue dot shift; trimming the waterproof cleaning fabric combined secondly, through the trimming cutter to obtain a multi-layer cleaning fabric sandwiched with a waterproof membrane; winding the multi-layer cleaning fabric to obtain a second finished product; and curing the wound second finished product. Before the waterproof membrane is glued, the adhesive bucket is preheated to 110° C.; during the gluing process, the temperature in winter is controlled at 103° C.-105° C., the temperature is controlled in summer at 100° C., and the humidity is controlled at 60%.

Therefore, through the waterproof cleaning fabric for daily use with the above structure and the composite production process for the same in the present disclosure, the source of "exhaust gas" is fundamentally eliminated, and in the whole composite production process there is no exhaust gas, no hot gas and no noise, to ensure a high degree of environmental protection in the whole composite production process, facilitate the reduction of composite production costs, and improve the quality of products in all directions. The finished products have antibacterial, deodorant, breathable, moisture-absorbing, soft, and environmentally friendly properties.

Finally, it should be noted that the above embodiments are only used to illustrate the technical solutions of the present disclosure instead of limiting them. Although the present disclosure has been described in detail with reference to the preferred embodiments, those of ordinary skill in the art should understand that: modifications or equivalent replacements can be made to the technical solutions of the present disclosure, and these modifications or equivalent substitutions cannot cause the modified technical solutions to deviate from the spirit and scope of the technical solutions of the present disclosure.

What is claimed is:

1. A composite production process of the waterproof cleaning fabric for daily use, comprising following steps of:

fabric placing step for placing a fabric on a fabric feeding rack, and a waterproof membrane on a membrane feeding roller, and rotating the fabric feeding rack and the membrane feeding roller simultaneously for feeding;

first combining step for conveying the fabric to a hot melt transfer device through a transmission chain to be firstly combined with the waterproof membrane subjected to glue dot shift, to obtain waterproof cleaning fabric, trimming step for trimming the combined waterproof cleaning fabric through a trimming cutter;

winding step for winding the trimmed waterproof cleaning fabric up through a swinging arm winding device to obtain a first finished product;

finished product curing step for curing the first finished product after the winding step; wherein when curing time is within 24 hours, 90% of the first finished product is cured; when the curing time is 5-7 days, 90%-100% of the first finished product is cured; a curing warehouse is maintained at a constant temperature not less than 25° C. and a humidity of 60%.

2. The composite production process according to claim 1, further comprising: second combining step for combining the waterproof cleaning fabric combined firstly, with additional fabric, wherein the second combining step comprises: placing the waterproof cleaning fabric combined firstly on the membrane feeding roller, and placing the additional fabric on a lining feeding rack; rotating the lining feeding rack and the membrane feeding roller for feeding; passing the additional fabric, though hydraulic deviation-rectifying devices, to the hot melt transfer device; secondly combining the additional fabric with the waterproof cleaning fabric combined firstly which has been subjected to the glue dot shift; trimming the waterproof cleaning fabric combined secondly, through the trimming cutter to obtain a multi-layer cleaning fabric sandwiched with a waterproof membrane; winding the multi-layer cleaning fabric to obtain a second finished product; and curing the wound second finished product.

3. The composite production process according to claim 2, wherein before the waterproof membrane is glued, an adhesive bucket is preheated to 110° C.; during a gluing process, a temperature in winter is controlled at 103° C.-105° C., a temperature in summer is controlled at 100° C., and a humidity is controlled at 60%.

4. The composite production process according to claim 3, wherein a hot melt glue machine is used in the composite production process, and the hot melt glue machine comprises the fabric feeding rack, the swinging arm winding device, the trimming cutter, the hot melt transfer device, the membrane feeding roller, and the lining feeding rack; the hot melt transfer device comprises a housing and a driving combination press roller, a driven combination press roller, a driven gluing roller and a driving gluing roller; the driving gluing roller, the driven gluing roller, the driven attachment press roller and the driving attachment press roller are all arranged in the housing, a glue scraper is arranged on an inner wall of the housing, and the glue scraper is arranged below the driving gluing roller.

5. The composite production process according to claim 4, wherein the driving gluing roller and the driven gluing roller are arranged in a same horizontal line, and the driving attachment press roller and the driven attachment press roller are arranged in a same vertical line, a side of the driving attachment press roller is provided with an aluminum distribution roller, and the aluminum distribution roller is arranged right above the driven gluing roller.

6. The composite production process according to claim 5, wherein the swinging arm winding device comprises a frame body, a swinging arm arranged on the frame body, and a winding press roller connected with the swinging arm and a winding frame, and the winding frame is arranged right below the winding press roller.

7. The composite production process according to claim 6, wherein a winding expander is arranged above the transmission chain, and a hydraulic deviation correction device is arranged behind the winding expander as well as in front of the lining feeding rack.

8. The composite production process according to claim 7, wherein an electric hoist is arranged above the hot melt transfer device and the lining feeding rack.

* * * * *